J. PEDDER & G. ABEL.
Manufacture of Blanks for Cultivator Teeth.

No. 150,708. Patented May 12, 1874.

Witnesses
James J. Kay
R. R. Bach

Inventors
John Pedder
George Abel
by Bakewell & Kerr
Attys

UNITED STATES PATENT OFFICE.

JOHN PEDDER, OF PITTSBURG, AND GEORGE ABEL, OF CHARTIERS TOWNSHIP, ALLEGHENY COUNTY, PENNSYLVANIA.

IMPROVEMENT IN THE MANUFACTURE OF BLANKS FOR CULTIVATOR-TEETH.

Specification forming part of Letters Patent No. 150,708, dated May 12, 1874; application filed April 24, 1874.

*To all whom it may concern:*

Be it known that we, JOHN PEDDER, of Pittsburg, and GEORGE ABEL, of Chartiers township, in the county of Allegheny and State of Pennsylvania, have invented a new and useful Improvement in the Manufacture of Blanks for Cultivator-Teeth; and we do hereby declare the following to be a full, clear, and exact description thereof, reference being had to the accompanying drawing, making a part of this specification, in which—

Figure 1:
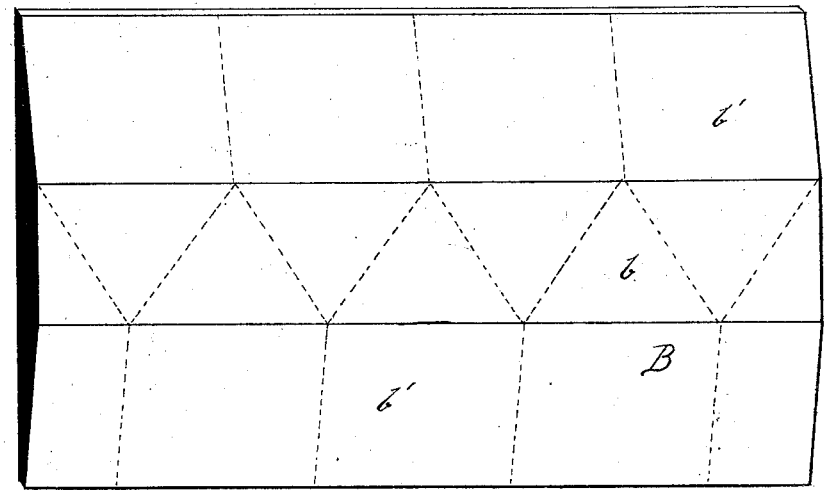
Figure 2:
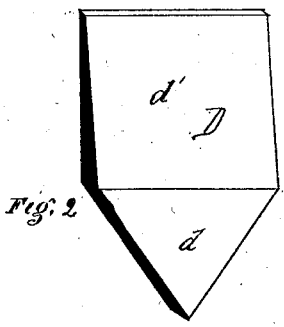
Figure 3:

Figure 1 shows, in perspective, a portion of a bar, such as we roll preparatory to the cutting of blanks therefrom. Fig. 2 is a like view of one of the blanks so produced; and Fig. 3 shows, by a like view, the form of a die suitable for cutting the blanks.

Like letters of reference indicate like parts in each.

To enable others skilled in the art to make and use our invention, we will proceed to describe the same.

The bar B is rolled in suitably-grooved rolls, with a central part, $b$, of a thickness equal to that desired in the cutting-blade $d$ of the tooth D; and the width of this thicker part $b$ is equal or about equal to the length desired in the blade $d$. From each edge of the part $b$ the bar B gradually tapers down, or is made thinner toward each edge, the thickness and width of such parts $b$ being about equal to the thickness and length desired in the shank part $d'$ of the tooth D. Then, by means of any suitable shears or cutting-dies, one form of which is shown in Fig. 3, the bar B is cut up into tooth-blanks D by lines of cut or division, as indicated by dotted lines in Fig. 1. In this way a long bar can be cut up into blanks with no other waste than that of two half-teeth or other fragmentary parts of teeth at the ends of the bar.

In cultivator-teeth of the class referred to it is desirable to get the metal so disposed as to bring the excess, if any, at the part or point of junction of the blade $d$ and shank $d'$. By our improvement we secure this result. The bevel along the edges is rolled in the usual way, and in rolling from point to base the metal will spread equally at the base as at the point, and any excess of metal will be rolled back and spread out into the bevel at the base on either edge, which, in this respect, will give exactly the form of tooth desired.

What we claim as our invention, and desire to secure by Letters Patent, is—

The manufacture of cultivator-tooth blanks by cutting them alternately from the opposite sides of the bar $b$, so as to give with least waste in each tooth a thick blade, $d$, and thin shank $d'$, substantially as set forth.

In testimony whereof we, the said JOHN PEDDER and GEORGE ABEL, have hereunto set our hands.

JOHN PEDDER.
GEO. ABEL.

Witnesses:
JOSEPH JONES,
LOUIS AURIN.